United States Patent [19]

Kennedy

[11] Patent Number: 5,345,658
[45] Date of Patent: Sep. 13, 1994

[54] FASTENER FOR TRUCK BED LINER

[75] Inventor: John W. Kennedy, Spring Grove, Pa.

[73] Assignee: York Products, Inc., Hanover, Pa.

[21] Appl. No.: 82,825

[22] Filed: Jun. 28, 1993

Related U.S. Application Data

[60] Continuation of Ser. No. 874,757, Apr. 27, 1992, abandoned, which is a division of Ser. No. 793,626, Nov. 18, 1991, Pat. No. 5,150,940.

[51] Int. Cl.⁵ ............... A44B 17/00; F16B 5/00
[52] U.S. Cl. ........................... 24/297; 24/289; 24/295; 296/39.2
[58] Field of Search ............ 24/297, 296, 295, 294, 24/293, 291, 289, 453, 543, 563, 573.1, 522, 458; 52/718.1; 296/39.1, 39.2

[56] References Cited

U.S. PATENT DOCUMENTS

| | | | |
|---|---|---|---|
| 1,135,612 | 4/1915 | Platt | 411/340 |
| 1,648,927 | 11/1927 | Wurdack | 411/345 |
| 2,451,591 | 10/1948 | Tinnerman et al. | 24/453 |
| 2,698,472 | 1/1955 | Knohl | 24/295 |
| 2,853,913 | 9/1958 | Rapata . | |
| 2,964,814 | 12/1960 | Parkin | 24/293 |
| 3,029,486 | 4/1962 | Raymond . | |
| 3,093,027 | 6/1963 | Rapata . | |
| 3,093,874 | 6/1963 | Rapata . | |
| 3,203,059 | 8/1965 | Becker | 24/295 |
| 3,477,190 | 11/1969 | Wood, Jr. | 52/718.1 |
| 3,508,371 | 4/1970 | Meyer | 24/295 |
| 4,122,583 | 10/1978 | Grittner et al. . | |
| 4,181,349 | 1/1980 | Nix et al. . | |
| 4,305,182 | 12/1981 | Peterson | 24/289 |
| 4,453,869 | 6/1984 | Cremieux | 411/344 |
| 4,470,737 | 9/1984 | Wollar . | |
| 4,572,568 | 2/1986 | Kapp et al. | 296/39 R |
| 4,595,229 | 6/1986 | Wagner . | |
| 4,656,807 | 4/1987 | Anhegger et al. | 52/718.1 |
| 4,659,133 | 4/1987 | Gower . | |
| 4,677,714 | 7/1987 | Wright . | |
| 4,707,016 | 11/1987 | McDonald | 296/39 R |
| 4,708,895 | 11/1987 | Mizusawa . | |
| 4,746,026 | 4/1988 | Wagner . | |
| 4,768,822 | 9/1988 | Gower . | |
| 4,796,942 | 1/1989 | Robinson et al. . | |
| 4,850,633 | 7/1989 | Emery . | |
| 4,906,040 | 3/1990 | Edwards . | |
| 4,924,561 | 5/1990 | Yoneyama . | |
| 5,046,775 | 9/1991 | Marcom, Jr. et al. . | |

OTHER PUBLICATIONS

"Futurex Automotive". . . Bedliner Installation. The date of publication is unknown. The place of publication is unknown. The author is Futurex Corporation. The publication consists of 2 pages.

*Primary Examiner*—Victor N. Sakran
*Attorney, Agent, or Firm*—Clifford A. Poff

[57] ABSTRACT

Disclosed is a one piece self sustaining fastener for securing a protective liner to the bed of a pick-up truck, the liner having on its two opposite vertical sides openings for receiving individual fasteners, each fastener having an extending portion adapted to pass into an opening of the liner and pass around and out of contact with an adjacent horizontal projecting portion of the rail of the bed, the extending portion having a free end that by a flexing action engages the inside wall of the rail at a point close to but spaced from the upper inside wall of the rail, the fastener also has a base portion at the inner end of the extending portion, including a projecting surface that has a portion that exceeds the dimension of the opening and which engages the outside adjacent surface of the liner, the base portion also has a portion that acts as a pivot when inserting the fastener into the opening and an opposite portion that by thumb pressure assumes a snap locking position after which the extending portion and the base portion fasten the liner to the bed.

10 Claims, 5 Drawing Sheets

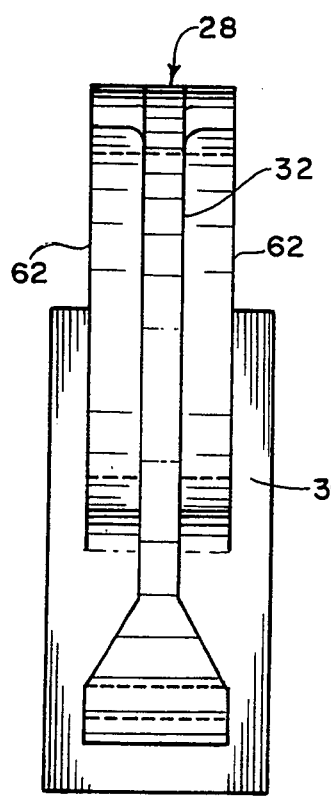
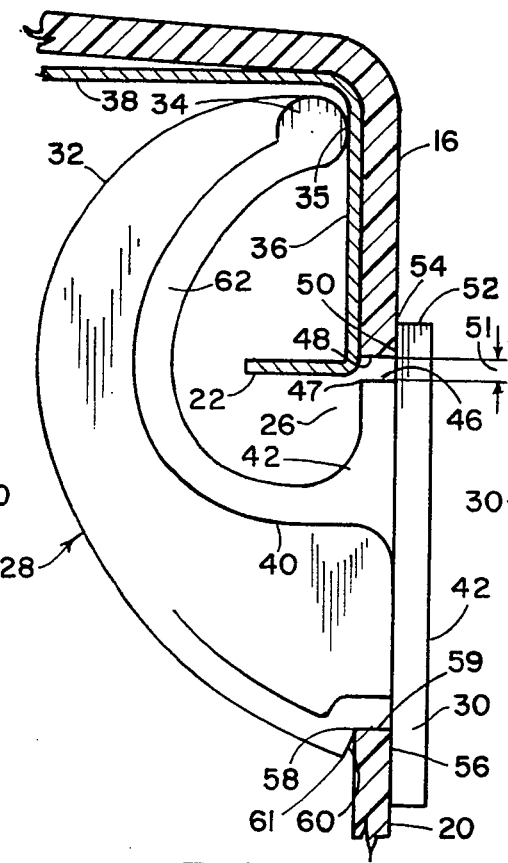
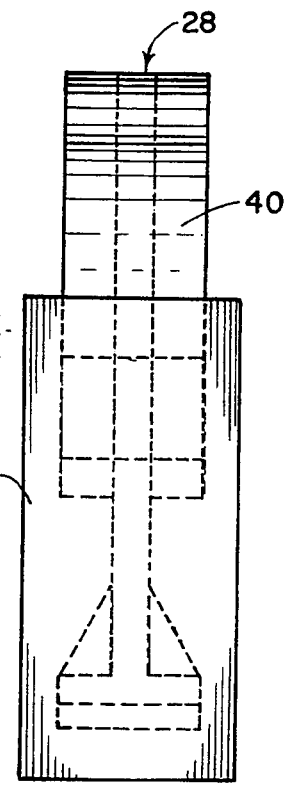
FIG.6  FIG.3  FIG.5
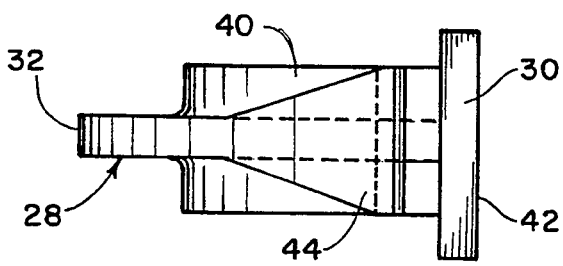
FIG.4

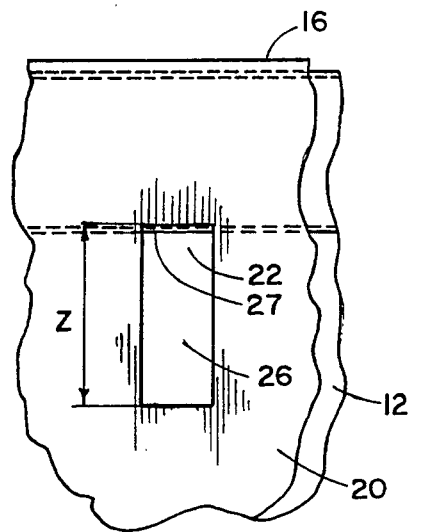
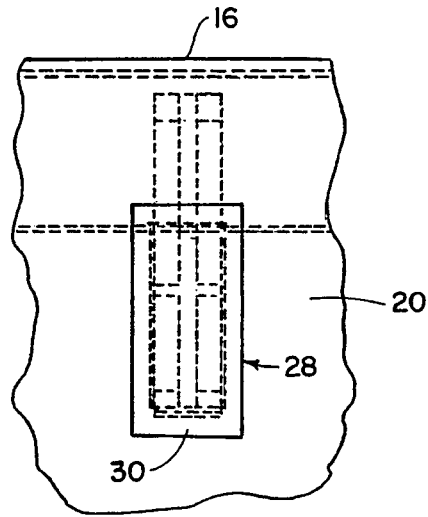
FIG.7     FIG.8
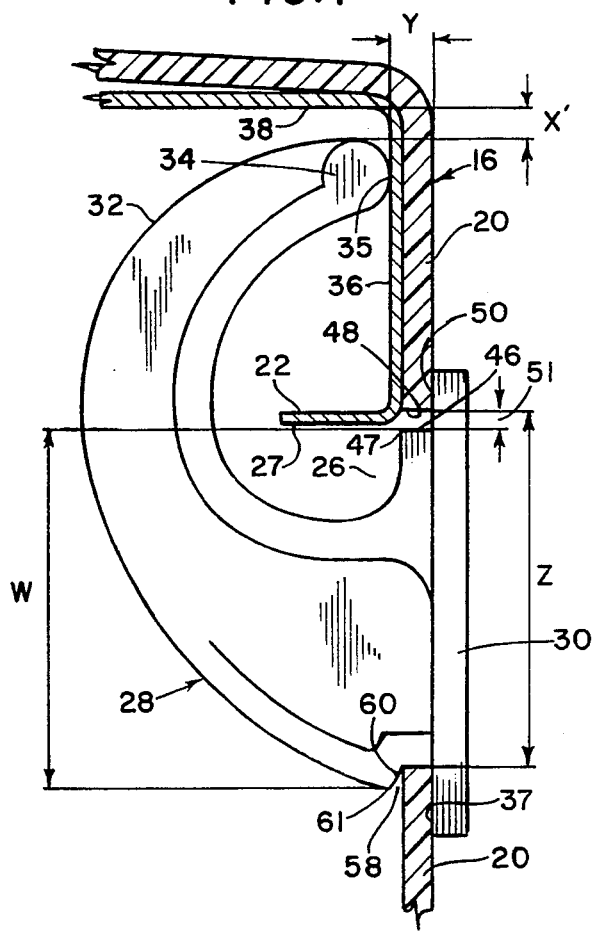
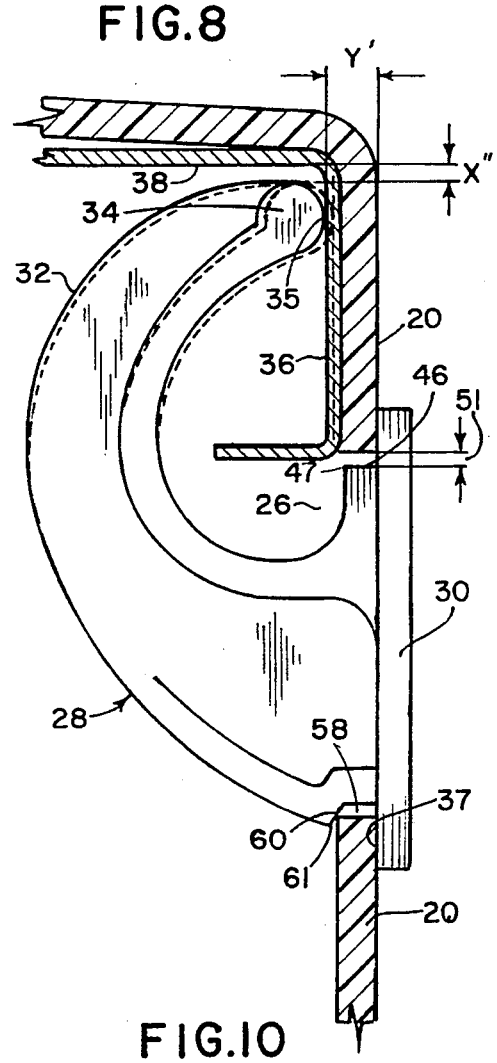
FIG.9     FIG.10

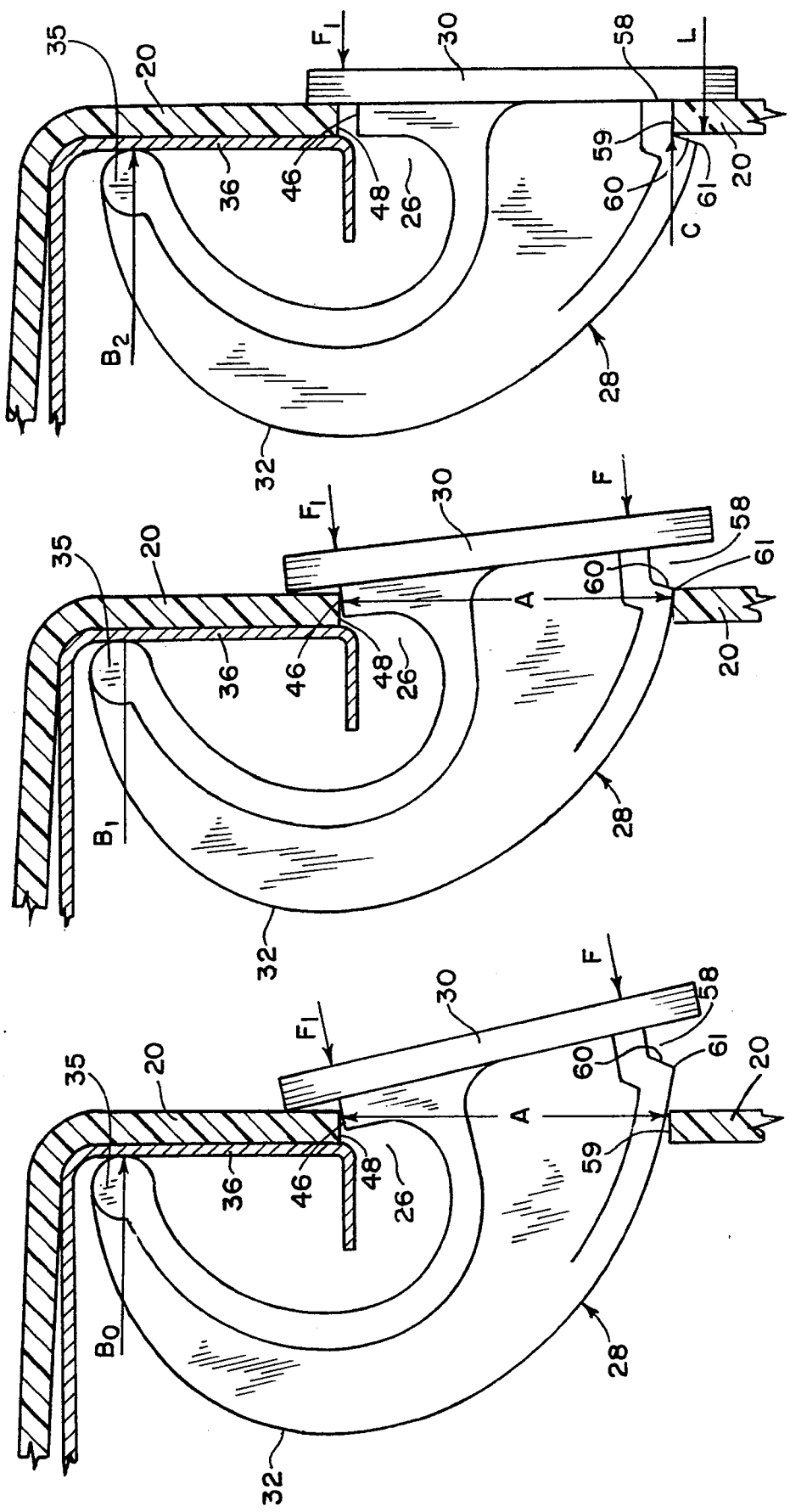

FASTENER FOR TRUCK BED LINER

This is a continuation of Ser. No. 07/874,757 filed on Apr. 27, 1992 and abandoned which is a divisional of co-pending application Ser. No. 07/793,626 filed on Nov. 18, 1991 now U.S. Pat. No. 4,130,940.

BACKGROUND OF THE INVENTION

The present invention relates to an improved fastener for securing a protective liner to the bed of a pick-up truck. In the use of protective liners for beds of pick-up trucks there have in the past been many different devices and suggestions of how to secure the liners to the beds. Examples of such devices and suggestions may be found in U.S. Pat. Nos. 4,595,229, 4,740,026, 4,796,942, 4,850,633 and 4,906,040.

Such devices involve the use of multi-part fasteners, from the very common screw nut assembly to a complicated bolt-ring-anchor locking member or fixture. Past designs also provided the beds and liners with special features, such as special openings and ridges, in which, the special openings provided in the beds created potential rust areas due to marking or scratching of the paint of the beds. Moreover, past devices required the use of tools to secure the fasteners and the fasteners many times did not have the capacity to accommodate different designs of beds.

A more recent design of a fastener appears in U.S. Pat. No. 5,046,775. The device shown in this patent relates to a one piece snap lock type fastener that is adapted to be inserted through a hole made in the liner and having a base plate that fits over the hole on the outside of the liner and a tongue that project into the hole. The outer peripheral surface of the tongue is formed with three distinct surfaces, namely a clamping surface, a cam surface and a locking surface. When mounted, the fastener is said to be locked between the clamping and locking surfaces which are provided in conjunction with the base plate with V-shaped throats to accommodate this purpose.

BRIEF DESCRIPTION OF THE INVENTION

It is an object of the present invention to provide one piece self sustaining fasteners for securing protective liners to beds of pick-up trucks of an inexposure, uncomplicated, highly effective design, which will be an improvement over known type fasteners for such purpose.

It is another object of the present invention to provide improved one piece self sustaining fasteners for securing protective liners to beds of pick-up trucks which will not require the drilling of holes or providing penetrations in the beds, nor the employment of expensive and complicated shaped members, nor the use of tools to secure the fasteners to the liners and the liners to the beds.

Another object of the present invention is to provide improved fasteners for liners used in beds of pick-up trucks formed of a one piece high yield strength material with a sufficient co-efficient of deflection and wherein the fasteners will provide for thermal expansion and contraction of the liners by allowing relative movement between the liners and metal truck beds but at the same time limit the tendency of the liners to inadvertently free themselves from the beds.

A still further object of the present invention of the type and kind of a fastener described above for securing a liner to the bed of a pick-up truck, in which the liner has on its two opposite vertical sides openings for receiving the fastener, the fastener being formed of a polymer having a C shaped extending portion adapted to pass into the openings of the liner and forcibly engaging an adjacent vertical portion of the bed, the fastener also having a base portion at the inner end of the extending portion, including a projecting surface having a portion that exceeds the dimension of the openings and which engages in a fastening manner the outside adjacent surface of the liner.

BRIEF DESCRIPTION OF THE DRAWINGS

FIGS. 3, 4, 5 and 6 are outside elevational views of the fastener shown in FIG. 2, FIG. 7 is a sectional view taken on lines VII—VII of FIG. 2, FIG. 8 is a partial outside view taken on lines VIII-—VIII of FIG. 2, FIG. 9 is a schematic view of the use of a fastener constructed in accordance with present invention for a minimum combined thickness of a liner and bed, FIG. 10 is a schematic view of the use of a fastener constructed in accordance with the present invention for a maximum combined thickness of a liner and bed, and FIGS. 11A, B and C are schematic sequence diagrams, indicating the application of forces involved during three different stages in inserting a fastener constructed in accordance with the present invention.

DETAIL DESCRIPTION OF THE INVENTION

Figure 1:
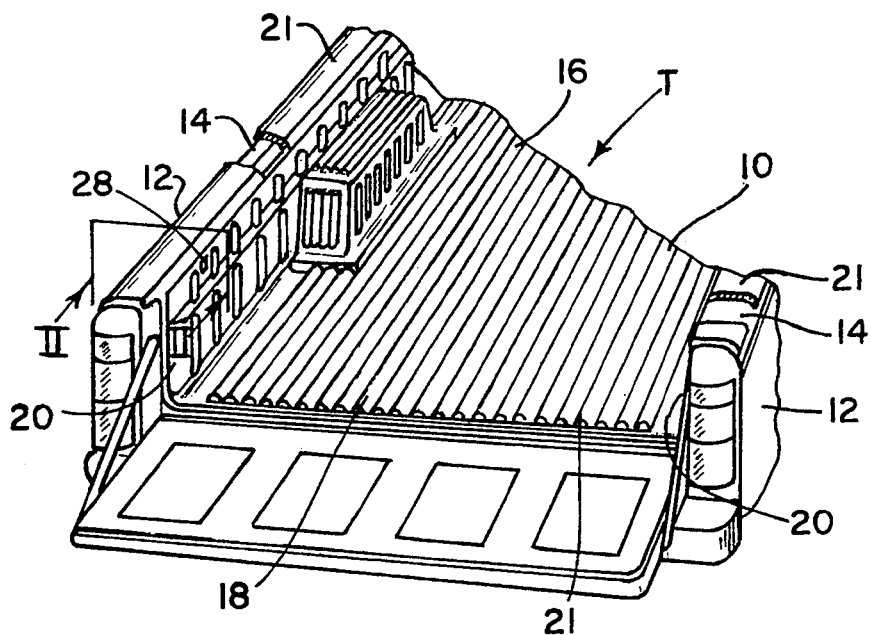
FIG. 1 is a partial perspective view of the cargo bed of a typical pick-up truck, including a protective bed liner secured to the bed by fasteners constructed in accordance with the present invention.

With reference to FIG. 1 there is illustrated a portion of a bed 10 of a typical pick-up truck T having opposed vertical side walls 12 which at their upper portions terminate into rails 14. In a well known manner, the bed 10 receives a protective bed liner, a portion of a typical one piece polymeric protective bed liner being indicated at 16. The liner has, in part, a floor portion 18, opposed side portions 20, the side portions having upper rail portions 23 that fit over the top horizontal surfaces of the rails 14 of the bed 10. This type of liner is commonly referred to as an "over the rail type". It is to be appreciated that the bed 10 and liner 16 are symmetrical about the longitudinal axis of the truck T.

Figure 2A:
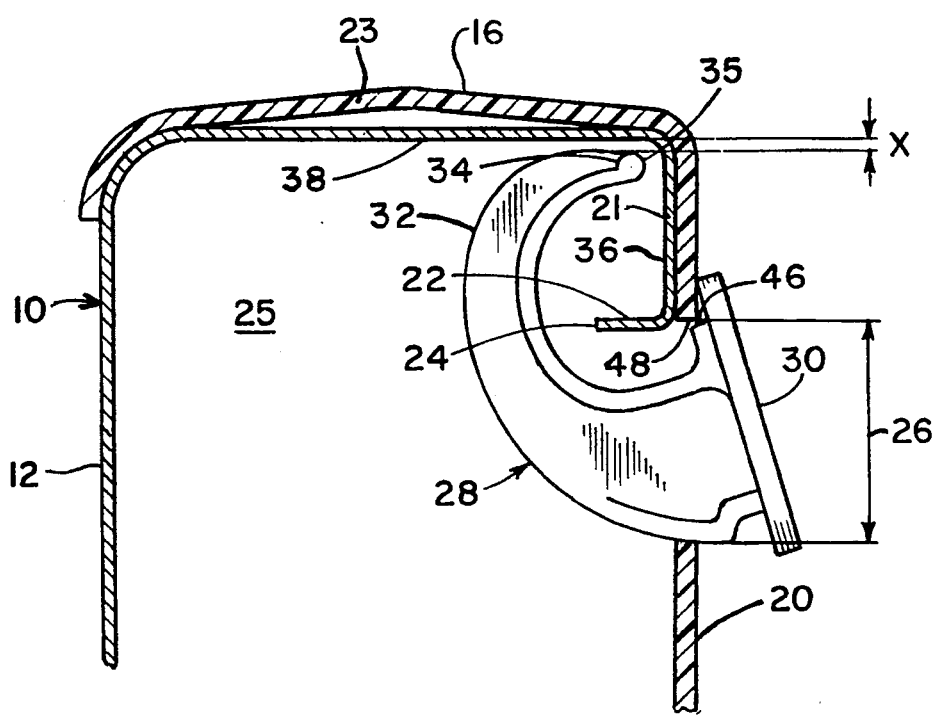
FIGS. 2A and 2B are sectional views taken on lines II—II of FIG. 1, FIG. 2A illustrating the position of the fastener immediately before fastening and FIG. 2B illustrating the fasetener in its fastening position.
Figure 2B:
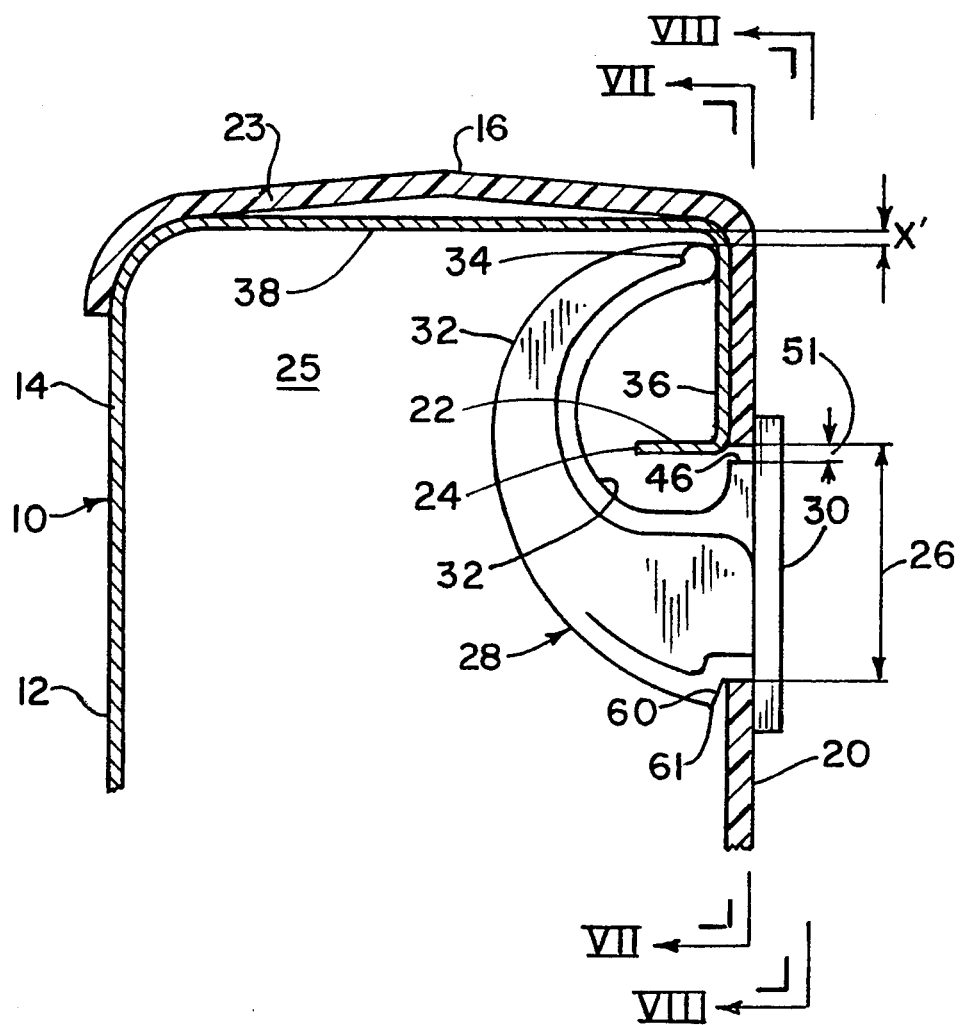

With reference now to FIGS. 2A and 2B both of which represent an enlarged portion of a section of one of the rails 14 of the bed 10 and an associated portion of the liner 16, the rail 14 is shown to have a downwardly extending flange 36 and a horizontal leg 22 that projects away from the liner 16 and has a free end 24, the leg 22 forming a portion in the shape of a channel 25 open towards the outside wall of the bed. The actual shape and design of the rail may vary depending on the manufacturer of the truck and for the particular year truck model, particularly as to the shape, vertical placement, and extent of the leg 22. The legs of some trucks may be shorter than what is shown and may be no more than up turned edges. FIGS. 2A and 2B also illustrates one of several fasteners 28 constructed in accordance with the present invention, used to secure the liner 16 to the upper portions of the side walls 12 of the bed 10.

In FIGS. 2A and 2B the liner 16 in the area towards the upper portion of the sides 20 and immediately below the leg 22 of the bed 10 is provided with a rectangularly shaped opening or slot 26 for one of the fasteners 28, similar openings being provided for other fasteners, the number of fasteners used depending on the truck bed size. As shown in FIGS. 7 and 8, the opening has a greater vertical dimension than its horizontal dimension. The size of the opening 26 are made to accommodate the adjacent rectangular outer base portion of the fastener 28 with only a slight perimeter overlap by the fastener sufficient to give the required holding force for the fastener against the liner.

The openings 26 in each side 20 of the liner are customarily located in the center and at the opposite ends of the liner. It is important to note that there is no need to drill or otherwise penetrate into the truck bed side walls or side rails, thus eliminating such labor, tools, time and any marking or scratching of the painted surface of the bed which would create a potential rusting condition.

With reference more particularly to the fastener itself and again referring to FIGS. 2A and 2B and in addition to FIGS. 3-6, the fastener consist of two distinct components, a base plate 30 and an extending or horizontally projection component 32. As shown, the component 32 takes the form of a "C" shaped extending portion with T cross section for strength and of a length sufficient to pass under and around the leg 22 of the rail 14, with the free end 34 forcefully engaging the inner vertical wall or flange 36 of the rial 14. In all cases, the inside opening of the C will extend away from the opening 26 so that no contact with the leg 22 of the rails 14 is possible for various rail designs within the allowable vertical relative movement of the rail and liner. The maintaining of a controlled distance between the free end 34 and the upper inside horizontal wall 38 of the rail 14, which distance is marked X and X' in FIGS. 2A and 2B, respectively, is important so that a predetermined restricted vertical upward movement of the liner can occur relative to the truck bed by virtue of the end 34 contacting the wall 38 to restrict such movement. In the illustrated form of the invention, this clearance is kept at a preferred nominal of 0.100". While for a given rail design this clearance may vary, the point of contact will always be a specifically designed point of contact determined by the placement of the opening 26 relative to the lower end of the wall 36 and the given length of the extending portion 32.

FIGS. 3-6 illustrate more of the detail construction of the fastener 28. In order to provide for the necessary strength and flexibility and particularly as to the extending portion 32 the necessary deflection quality, the portion 32 at its inside radius is formed as a flat surface 40 having a width less than the corresponding flat surface 42 of the base plate 30 and slightly less than the width of the opening 26, this construction being best shown in FIG. 5. A some what similar construction exists at the outside radius of the portion 32 where it has an increasing tapered flat surface portion 44 of a maximum width equal to that of the surface 40, this construction being best shown in FIG. 4.

The outer most tip 35 of the free end 34 of the extending portion 32 has a fixed relationship to the surface 50 of the outer base plate 30, represented by the distance marked Y in FIG. 9. As best shown in FIGS. 9 and 10, this distance is such that given the expected varying combined thickness dimensions of the liners 16 from liner to liner and the adjacent vertical walls 36 of the rails 14 from one truck rail model to another, the extending portion 32 will be subject to a flexing or deflection, well within the elastic limit of the material, due to the simultaneous contact of the tip 35 of the free end 34 with the wall 36 of the rail and the surface 50 of the inner base plate 47 with the liner 16. This combined thickness of the liners and walls 36 may be typically a 0.160" variation from liner-bed to liner-bed of different truck models, which is represented in FIGS. 9 and 10 as Y and Y'. FIG. 10, illustrates by the dash lines the position of the extending portion 32 for the minimal thickness combination of liner-bed thickness. The hard line position of the extending portion 32 represents the new position of the extending portion as a result of the increased combined thickness of liner-bed. As shown in comparing the relationship of FIGS. 9 and 10 of the notch 58 at the bottom of the fastener 28 with the two different liner wall thickness 20, an inclined surface 60 of the notch is engaged at a different point of this surface, thereby maintaining the liner 20 against the inner vertical face 37 of the adjacent portion of the base plate 30. Also to be noted in comparing the above relationship relative to the free end 34 with the horizontal wall 38 is that in FIG. 10 the distance X" is less than the distance X' of FIG. 2B and FIG. 9.

The fastener is designed so that in the given example the distance Y of the fastener of its free state will always be nominally 0.030" less than the minimum combined thicknesses of the liner 16 and the rail 14. The flex designed into the extending portion 32 of the fastener 28 will also provide for the change that may occur in its flexing characteristic under extreme cold and hot weather conditions so as not to break or deform during deflection and further if removed from the liner, the free end 34 will return to its original free state. The simultaneous application of pressure by the free end 34 and the base plate 30 while being sufficient to securely fasten the liner 16 to the rail 14, will still allow horizontal sliding movement of the liner relative to the bed caused by thermal expansion or contraction of the liner, without creating any undue stress on the fastener.

FIG. 3 also shows two other important features of the fastener 28. Inside the upper portion of the base plate 30 the horizontal edge 46 of the inner base plate 47 is provided which serves to form with the adjacent inside surface 50 of the base plate 30 a pivot point or fulcrum for the fastener. The point of rotation of the pivot point is the corner formed by the edge 46 and surface 50 in contact with the adjacent upper edge of opening or slot 26 and the face of liner 16. The relationship is obtained by dimensioning the opening 26 and base plate 30 to bring about the pivot action. The projecting thickness of the inner base plate 47 is designed to be less than the minimal thickness of the liner. Also, the inner base plate 47 is formed with a generally straight downward surface so that the edge 46 will not incur an obstructing surface behind the inner wall of the liner which could cause a dislodging of the edge from its pivot.

At the lower inside portion of the base plate 30 and the adjacent portion of the extending portion 32, designated by legend 56, the notch 58 is provided being arranged directly below the inner base plate 47, as one views FIG. 3. The notch 58 is shaped by flat surfaces and extends upwardly from the lower end of the base plate 30 and is designed to snap over and around the adjacent lower slot edge 59 of the liner as the last step in securing the fastener 28, as will be explained in more detail later. The innermost generally vertical surface 60 of the notch 58 is chamfered or inclined to assist, as noted above, in the insertion of the fastener 28. In FIG. 2A, the fastener is shown with its edge 46 in engagement with the upper edge 48 of the opening 26 and the extending portion 32 rotated to a position immediately before the notch 58 is forced over the lower outside edge of the opening 26 with the free end 34 out of contact with the wall 36. In this condition of the cooperative elements, the distance X in FIG. 2A between the free end and the wall 38 is slightly less than the distance X' of FIG. 9.

An important characteristic of the fastener 32 is the relationship maintained between the edge 46 of the stepped inner base 47 and the notch 58. In referring to FIG. 9, the legend Z represents the distance of the opening 26 along its long side as this side is best seen in FIGS. 7 and 9. This distance Z is less than the distance W also shown in FIG. 9, which represents the distance between the pivot corner formed by the edge 46 and surface 50 and the corner marked 61 formed, in part, by the upper surface at the inner top of the notch 58. In the illustrated example of the fastener 28, the distance Z is 1.250" i.e., the vertical dimension of the liner slot 26, and the distance W is 1.280" or 0.030" greater than the vertical dimension of the liner slot 26 thus generating a 0.030" interference fit at the final snap in condition immediately before the notch 58 moves beyond the inner most edge of the bottom of the slot 26. After being fully inserted, a clearance 51, shown in FIGS. 2B and 3, always exists between the inner base plate 47 and the edge 48 of the liner 16.

As shown in FIGS. 2A and 2B, the fastener 28 from the base plate 30 to the free end 34 does not take the form of a constant curve or portion of a circle but instead takes an eccentric shape, wherein the portion closest to the base plate 30 of the fastener has substantially larger inside and outside radii than continuation of the surfaces to the free end 34. Given the illustrated length of the extending portion 32, as noted above, the eccentricity presents the free end 34 with a considerable space away from the inner end 24 of the horizontal leg 22 of the rail 14 and above the leg. This construction is designed to accommodate various rail designs, ones that have various length legs 22 and those that do not have any such legs, in which the rails have only inside vertical walls. Thus, the extending portion 32 is designed so as to always pass around the legs 22 without making contact therewith and still engage the walls 36 of various formed rails.

The fastener 28 is preferably made out of polymer which is compatible with the liner from an appearance standpoint. The fastener may be formed by a well known molding technique from a known type of material that will give the characteristics mentioned herein. The horizontal width of the fastener, relative to the width of the opening 26 and the fact that its curved edges 62, shown best in FIG. 6, are continuous as one views FIG. 3, allows the fastener to be conveniently and easily inserted into the opening 26. In the insertion of the fastener there is no contact made between the outside and inside radial transverse surfaces of the extending portion 32 with the liner 16 or leg 22.

The opening or slot 26 of the liner 16 are carefully located with reference to the particular rail design involved so that the lowest most portion or edge of the vertical wall 36 of the rail 14, indicated by legend 27 in FIG. 7, is slightly below the upper horizontal edge or side of the opening 26. This edge serves to locate the rectangular slot in the liner. In this manner, given the fixed length of the extending portion 32, the obtaining of the dimension Y is achieved for the universally used fastener 28 for different rail designs. In FIG. 9, the dimension Y, which represents the minimum combined thickness of the rail and the liner, is 0.030" greater than the free state dimension between tip 35 of the extended portion 32 and surface 50 of the outer base plate 30.

By employing the corner formed by the edge 46 and the surface 50 of the base plate 30 as a pivot point without any flexing of the base plate, the extending portion 32 is rotated upwardly until the free end 34 contacts the vertical wall 36 of the rail 14. Until this contact is made, there is no contact by the extending portion with the liner or bed and hence no stress is placed on the fastener until the free end 34 makes contact with the wall 36. After this contact, thumb pressure is applied to the outside lower end of the base plate 30 until the notch 58 engages the adjacent portion of the liner. In its fastening position, the fastener 28 is securely positioned and will apply a constant pressure to the several contacting surfaces with the liner on the one hand and the rail on the other. This is all accomplished in a simple quick manner without the need to drill holes in the bed, provide special holding or contacting bed surfaces or need to handle multiple fastener parts, or the need of the use of any tools.

In FIGS. 11A, 11B and 11C there appears a series of arrows for the purpose of briefly explaining the application of the primary forces involved both in inserting the fastener and when the fastener is in its operative position. These three force diagrams also employ legends A, B0, B1, B2, C, F, F1 and L to indicate these forces.

In the position of the fastener illustrated in FIGS. 11A, and 11B, the arrows A indicate the compression force A placed on the fastener by the interference fit that exist between the fastener 28 and the opening 26 represented by the Z and W dimensions appearing in FIG. 9 before the notch 58 passes over the surface 59 of the liner slot 26.

In FIG. 11A the force Be =0, since contact point 35 of extended portion 32 has just made contact with bed rail 36, but no deflection from its free state dimensional relationship to the surface 50 (inside face of outer base 30) has occurred. In FIG. 11B, as force F moves the contact point 35 to deflect the extended portion 32 from its free state, $B_1$ increases to almost maximum force, this occurring just before the notch 58 engages its surface 60 with the inner edge of the slot 26 in the liner 20. The designed "C" shape and "T" cross section of portion 32, and the semi-elastic material selected for the entire fastener 28 generates a reactive force $B_1$ when contact point 35 is deflected from its free state dimensional relationship to the surface 50. The force F is the normal expected hand, i.e., thumb pressure exerted to initiate the insertion of the fastener 28 into the slot 26. The force F is the result of the leverage condition of FIGS. 9 and the expected thumb pressure.

In FIG. 11C, the fastener 28 is completely installed into the liner slot 26 when the notch 58 engages its side 60 by a snapping action with the inside edge of slot 26 in the liner 20. With this action the liner wall 20 is tightly and securely held to the bed rail 36 by the following locked force system: Opposing but not equal forces $B_2$ and $F_1$ (again referring to FIG. 11C) are "locked in" by the engagement of notch 58 and its side 60 in contact with the inside edge of slot 26 and thus results in holding force C being opposed by force L which was created by the material strength (just below the slot 26) of the liner wall 20. In FIG. 11C, when the notch 58 passes over the surface 59 of the side 20 of the liner and snaps into its holding position, the notch and hence the fastener will lower itself over the side 20, the extent depending on the thickness of the side in contact with the wedge surface 60.

While the present invention has been described in accordance with the preferred embodiment, it is to be understood that other similar embodiments may be used or modifications and additions may be made to the described embodiment for performing the same or similar functions of the present invention without deviating therefrom. Therefore, the present invention should not be limited to any single embodiment but rather construed in breadth and scope in accordance with the recitation of the. appended claims.

I claim:

1. A one piece fastener,
   said fastener having a body member,
   said body member having an extending section with a free end and a base section opposite said free end,
   said extending section being deflectable within the elastic limit of the material of said extending section,
   said extending section taking the form of a "C" having one end terminating into said base section and its opposite end terminating into said free end,
   said base section having an inside pivot surface at its side closest to said free end of said extending section, and
   said base section having an inside recess located at its side furtherest away from said free end of said extending section generally opposite said pivot surface, said inside recess taking the form of a notch projecting inwardly towards the center of said body member for forming a wedging surface, said wedging surface and said free end of the extending section cooperating to clamp the clip for preventing movement thereof.

2. A fastener in accordance with claim 1, said fastener being formed of a one piece polymeric material.

3. A fastener for insertion through an opening in a first member and providing for thermal expansion and contraction thereof by allowing relative movement between said first member and a rigid support member, a portion of such first member overlying a terminal edge portion of such a rigid support member with said opening being located closely adjacent such terminal edge portion, said fastener comprising:
   a base plate section have a generally planar surface extending along one portion thereof,
   an elongated section having one end portion joined to said base plate section, said elongated section extending outwardly from said planar surface, said elongated section having a free end facing a plane containing said planar surface,
   said elongated section forming a recess adjacent said planar surface which recess extends inwardly of said elongated section and thence towards said free end and forming a pivot at the junction of said recess and said planar surface for pivoting said base plate section to deflect said elongated section, said elongated section always passing around such terminal edge portion of such rigid support member,
   said elongated section having an outer surface configuration adapted to guide a portion of such a first member into a notch projecting inwardly towards the center of said elongated section for forming a wedging surface, said wedging surface and the free end of said elongated section cooperating to clamp the clip for preventing movement thereof, and
   said elongated section including the entire free end thereof being deflected by an elastic stress relative to said base to hold such overlying portions therebetween when such overlying portions are received between said free end and such plane containing said planar surface.

4. The fastener according to claim 3 further including notch means between said base plate section and said elongated section to interlock with such first portion.

5. The fastener according to claim 3 wherein said elongated section is arcuate throughout its length.

6. The fastener according to claim 5 wherein said recess defines a width corresponding to the greatest width of said tapered flat surface portion terminating at the open end of said recess.

7. The fastener according to claim 3 wherein said recess extending to said free end has an arcuate configuration facing said planar surface.

8. The fastener according to claim 3 wherein said pivot means includes a horizontal edge.

9. The fastener according to claim 3 wherein the configuration of said outer surface of the elongated section includes a tapered flat surface portion terminating at said recess.

10. The fastener according to claim 3 wherein said one end portion embodies a tapering reduction to a cross sectional configuration extending to said free end to allow flexure of said one end portion.

* * * * *